(12) United States Patent
Zheng et al.

(10) Patent No.: US 12,720,218 B1
(45) Date of Patent: Aug. 25, 2026

(54) SWITCHABLE CONVERSION GAIN IMAGE SENSOR WITH IMPROVED UNIFORMITY AND METHODS THEREOF

(71) Applicant: OMNIVISION TECHNOLOGIES, INC., Santa Clara, CA (US)

(72) Inventors: Yuanwei Zheng, San Jose, CA (US); Sriram Sundarrajah, Pleasanton, CA (US); Ikuko Inoue, Kanagawa (JP)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 18 days.

(21) Appl. No.: 19/062,862

(22) Filed: Feb. 25, 2025

(51) Int. Cl.
*H04N 25/42* (2023.01)
*H04N 25/77* (2023.01)

(52) U.S. Cl.
CPC ............ *H04N 25/42* (2023.01); *H04N 25/77* (2023.01)

(58) Field of Classification Search
CPC .............................. H04N 25/42; H04N 25/77
See application file for complete search history.

(56) References Cited

U.S. PATENT DOCUMENTS

2020/0387533 A1* 12/2020 Nolte .................... G06F 40/279
2023/0261038 A1* 8/2023 Huang .................. H10D 1/714 257/534
2026/0006921 A1* 1/2026 Yu ....................... H04N 25/771

* cited by examiner

*Primary Examiner* — Christopher K Peterson
(74) *Attorney, Agent, or Firm* — Christensen O'Connor Johnson Kindness PLLC

(57) ABSTRACT

A switchable conversion gain image sensor and a method is described. The switchable conversion gain image sensor includes a pixel cell array including a plurality of pixel cells arranged in rows and columns. Individual pixel cells each include one or more photodiodes configured to generate image charge in response to incident light, a plurality of conversion gain capacitors, including a high conversion gain capacitor and a low conversion gain capacitor, and a switch transistor coupled between the high conversion gain capacitor and the low conversion gain capacitor. The high conversion gain capacitor and the low conversion gain capacitor are selectively coupled to receive the image charge from the one or more photodiodes. The pixel cell array is segmented into a plurality of zones. The low conversion gain capacitor for the individual pixel cells physically vary on a zone-by-zone basis.

20 Claims, 8 Drawing Sheets

SWITCHABLE CONVERSION GAIN IMAGE SENSOR WITH IMPROVED UNIFORMITY AND METHODS THEREOF

TECHNICAL FIELD

This disclosure relates generally to image sensors, and in particular but not exclusively, relates to CMOS image sensors and applications thereof.

BACKGROUND INFORMATION

Image sensors are one type of semiconductor device that have become ubiquitous and are now widely used in digital cameras, cellular phones, security cameras, as well as, medical, automobile, and other applications. As image sensors are integrated into a broader range of electronic devices it is desirable to enhance their functionality, performance metrics, and the like in as many ways as possible (e.g., resolution, power consumption, dynamic range, size, etc.) through both device architecture design as well as image acquisition processing. However, it is appreciated that many of these metrics are inversely related. For example, pixel size may be increased to improve dynamic range but have increased noise. In another example, resolution may be increased by increasing the number of pixels, but if pixel size is maintained then the physical size of the image sensor increases. Accordingly, improving one or more performance metrics of semiconductor devices such as image sensors while mitigating adverse effects on other performance metrics remains challenging.

The typical image sensor operates in response to image light reflected from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is readout as analog image signals from the column bitlines and converted to digital values to produce digital images (i.e., image data) representative of the external scene.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1A:
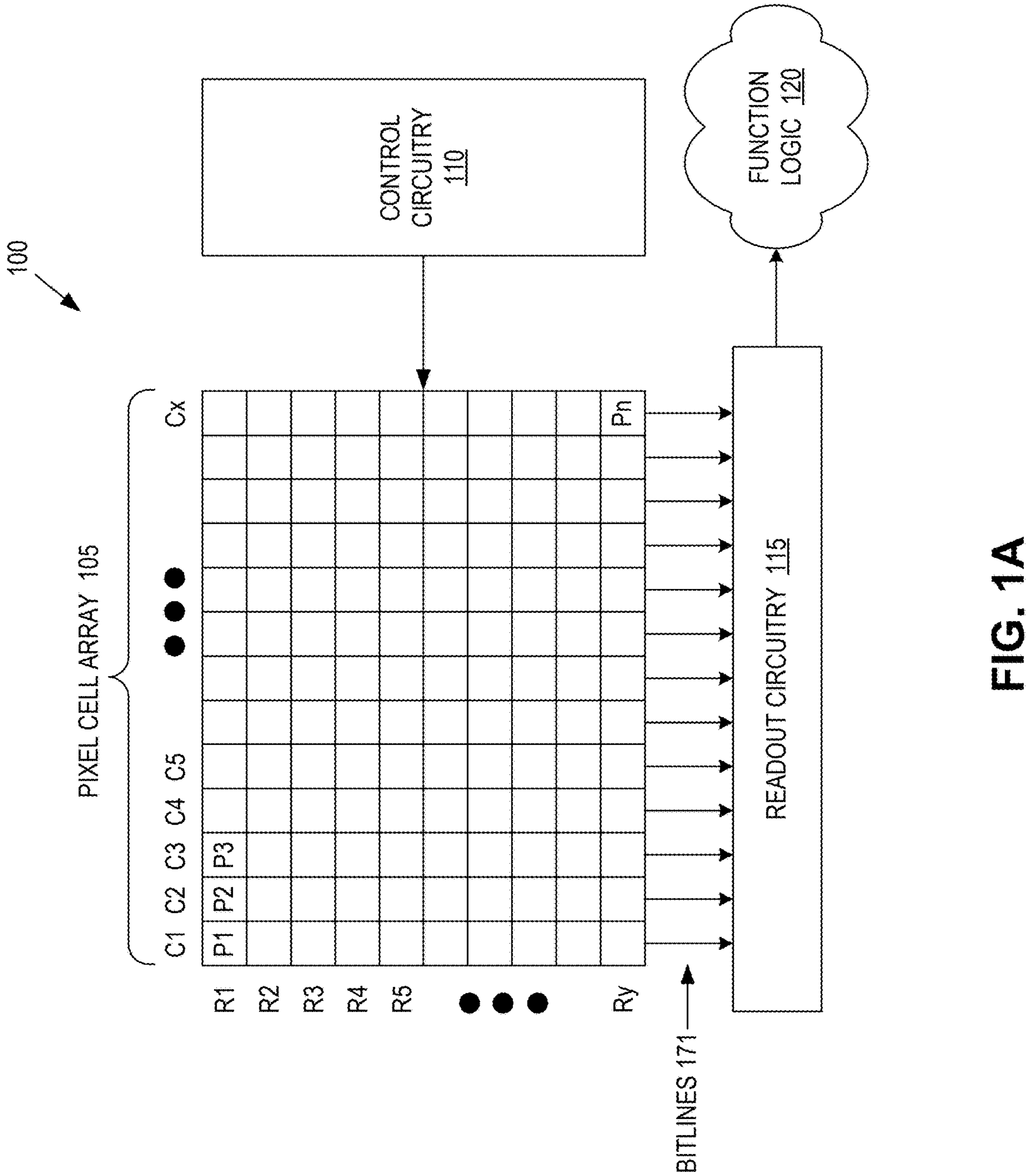
FIG. 1A illustrates a block diagram of a switchable conversion gain image sensor, in accordance with an embodiment of the disclosure.

Embodiments of an apparatus, system, and method each related to a switchable conversion gain (SCG) image sensor with improved uniformity (e.g., related to one or more conversion gain capacitors) are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

It will be understood that, although the terms first, second, third, etc., may be used in the disclosure and claims to describe various elements, these elements should not be limited by these terms and should not be used to determine the process sequence or formation order of associated elements. Unless indicated otherwise, these terms are merely used to distinguish one element from another element. Thus, a first element discussed below could be termed a second element without departing from the teachings of the disclosed embodiments.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Embodiments of the disclosure describe a switchable conversion gain (SCG) image sensor with improved uniformity and corresponding methods thereof. The term "switchable conversion gain" image sensor corresponds to an image sensor capable of multiple modes of readout, which has the benefit of improved signal-to-noise (SNR) ratios and widened dynamic range. Examples of readout modes include a high conversion gain mode used in low light conditions and low conversion gain mode used in bright light conditions that respectively make use of the differing full well capacity associated with the readout modes. In some embodiments, multiple conversion gain modes may be utilized for high dynamic range imaging. For example, if readout of a given pixel cell is saturated during high conversion gain mode under strong light, then a corresponding readout signal without saturation for the given pixel cell during the low conversion gain mode will be read and replace the high conversion gain mode signal with its signal level multiplied by a conversion factor (e.g., conversion gain ratio between high conversion gain (HCG) to low conversion gain (LCG)), such as, $$\text{signal}_{HCG(sat)} = \text{signal}_{LCG} * \frac{HCG}{LCG}\Big).$$

As the final image in some embodiments corresponds to the combination of pixel cell signal (e.g. from high conversion mode or low conversion gain mode), a non-uniform conversion gain ratio will cause the image to deviate from the light condition of the real environment at a pixel or pixel cell level. In some embodiments, a target conversion gain ratio (e.g., between high conversion gain mode and low conversion gain mode) difference across the pixel array is defined to be within 1% or even lower for high quality SCG applications.

It is appreciated that multiple conversion gain modes may be utilized to generate high dynamic range images by combining, for example, images generated from different respective conversion gain modes (e.g., a high dynamic range image may be generated by combining respective high conversion gain mode images and low conversion gain mode images). However, high dynamic range (HDR) image quality depends, at least in part, on uniformity (e.g., in terms of conversion gain ratio, conversion gain, and/or capacitance associated with one or more conversion gain capacitors) across an image sensor array. For example, a ratio between high conversion gain modes and low conversion gain modes (e.g., in terms of full well capacity, capacitance, conversion gain, or other characteristic performance metrics) that deviates across the pixel cell array may adversely affect performance of high dynamic range imaging. In some embodiments, it may be desirable for high performance switchable conversion gain image sensors to have differences of a high conversion gain to low conversion gain ratio to be less than 1% across the entire pixel cell array (e.g., deviation across an entire pixel cell array from center to edge to be less than 1%) to achieve uniformity across the entire pixel cell array. However, it was found that a conventional design process may result in a high conversion gain to low conversion gain ratio to be greater than 1%. In particular, it has been observed that conversion gain capacitors (e.g., high conversion gain capacitor such as a floating diffusion, low conversion gain capacitor, lateral overflow integration capacitor such as metal-oxide-metal capacitor, or combinations thereof) associated with individual pixel cells formed across an image sensor die may have fabrication variance due to limitations with associated fabrication tools or processes (e.g., the damascene process to form metal interconnects may also be utilized to form metal-oxide-metal low conversion gain capacitors which may result in performance variance across a pixel cell array). In particular, it was found that capacitors formed in a metallization region of a switchable conversion gain image sensor (e.g., low conversion gain capacitors) may be particularly susceptible to fabrication variance across a pixel cell array of a given die or wafer and result in a lack of performance uniformity.

Embodiments disclosed herein provide a switchable conversion gain image sensor and corresponding design methodology that separates the design of one or more conversion gain capacitors from the pixel cell unit within the mask layout design to improve uniformity across the image sensor. For example, rather than having the same design (e.g., in terms of fixed pattern layout, metal spacing, metal thickness, or combinations thereof) for each low conversion gain capacitor across a pixel cell array, embodiments herein may instead segment the pixel cell array into a plurality of zones and subsequently design each low conversion gain capacitor within a given zone to have a structure that compensates for fabrication and/or performance variance. It is appreciated that the aforementioned design methodology may be an iterative approach used to compensate for variance based on process feedback. Consequently, an improved switchable conversion gain image sensor with a pixel cell array segmented into a plurality of zones having different conversion gain capacitor designs is described in embodiments herein.

FIG. 1A illustrates a block diagram of a switchable conversion gain image sensor 100, in accordance with an embodiment of the disclosure. In particular, image sensor 100 corresponds to an example imaging system including pixel cell array 105, control circuitry 110, readout circuitry 115, function logic 120, and plurality of bitlines 171. In one embodiment, pixel cell array 105 is a two-dimensional array including a plurality of pixel cells (e.g., P1, P2, P3, . . . . Pn) that are arranged in rows (e.g., R1 to Ry) and columns (e.g., C1 to Cx) to acquire image data of a person, place, object, etc., which can be used to render an image of a person, place, object, etc. In some embodiments, individual pixel cells included in pixel cell array 105 may each include one, two, four or more photodiodes configured to photogenerate image charge in response to incident light. In the same or different embodiments, each of the plurality of pixel cells may include two or more conversion gain capacitors (e.g., a high conversion gain capacitor such as a floating diffusion, a low conversion gain capacitor such as a metal-oxide-metal capacitor, and the like) selectively coupled to one or more photodiodes to receive the image charge. In some embodiments, pixel cell array 105 is segmented into a plurality of zones and the low conversion gain capacitors included in individual pixel cells physically vary on a zone-by-zone basis (e.g., in terms of metal spacing, metal thickness, metal width, metal length, or other physical dimensions of components that form the low conversion gain capacitors) with respect to the plurality of zones. In some embodiments, readout circuitry 115 may be configured to read out image data (e.g., representative of image charge photogenerated by photodiodes included in the plurality of pixel cells in the pixel cell array 105 in response to incident light) through plurality of bitlines 171 (e.g., column bitlines). In some embodiments, readout circuitry 115 may include amplification circuitry, analog-to-digital (ADC) circuitry, sample-and-hold circuitry, image buffers, or otherwise to facilitate converting an analog signal (e.g., image signals) to a digital signal (e.g., image data). Image data output by readout circuitry 115 may then be received by function logic 120. Function logic 120 is coupled to readout circuitry 115 to receive image data to de-mosaic the image data and generate one or more image frames. In some embodiments, the electrical signals and/or image data can be manipulated or otherwise processed by function logic 120 (e.g., apply post image effects such as crop, rotate, remove red eye, adjust brightness, adjust contrast, or otherwise).

Figure 1B:
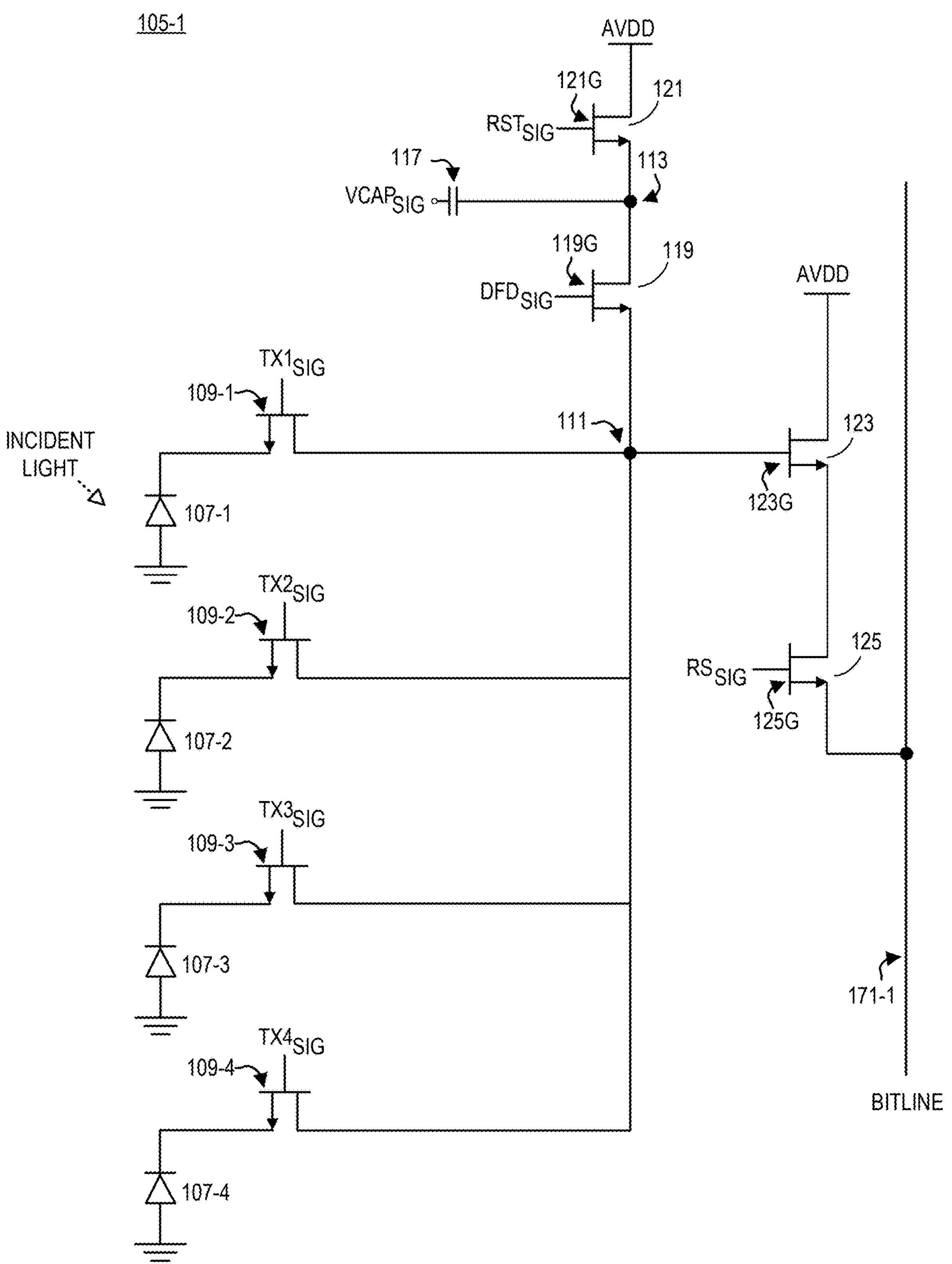
FIG. 1B illustrates an example pixel cell circuit for a pixel cell included in switchable conversion gain image sensor of FIG. 1A, in accordance with an embodiment of the disclosure.

FIG. 1B illustrates an example pixel cell circuit for a pixel cell 105-1 included in switchable conversion gain image sensor 100 of FIG. 1A, in accordance with an embodiment of the disclosure. The example pixel circuit for pixel cell 105-1 is one example of a pixel circuit capable of multiple conversion gain modes for reading, including a high conversion gain mode and a low conversion gain mode. However, it is appreciated that other pixel cell circuit configurations capable of switchable conversion gain modes may be utilized.

Pixel cell 105-1 may be representative of each instance of an individual pixel cell (e.g., P1, P2, P3, . . . , Pn) included in pixel cell array 105. In other words, multiple instances of pixel cell 105-1 may be arranged in rows and columns to form pixel cell array 105 in accordance with embodiments of the disclosure. However, as it will be discussed in the foregoing, one or more conversion gain capacitors (e.g., first floating diffusion 111, low conversion gain capacitor 117, other conversion gain capacitors included in pixel cell array 105, or combinations thereof) may have different designs on a zone-by-zone basis to improve unity (e.g., in terms of performance metrics such as conversion gain, conversion gain ratio, capacitance, or the like).

Pixel cell 105-1 includes a first photodiode 107-1, a second photodiode 107-2, a third photodiode 107-3, a fourth photodiode 107-4, a high conversion gain capacitor (e.g., represented by or corresponding to first floating diffusion 111 in the form of a junction capacitor), second floating diffusion 113, a low conversion gain capacitor 117 coupled to second floating diffusion 113, a first transfer gate electrode 109-1 associated with a first transfer transistor, a second transfer gate electrode 109-2 associated with a second transfer transistor, a third transfer gate electrode 109-3 associated with a third transfer transistor, a fourth transfer gate electrode 109-4 associated with a fourth transfer transistor, a dual floating diffusion gate electrode 119G associated with a dual floating diffusion transistor 119, a first reset gate electrode 121G associated with a reset transistor 121, a source-follower gate electrode 123G associated with a source-follower transistor 123, and a row select gate electrode 125G associated with a row select transistor 125.

It is appreciated that in various embodiments of the disclosure, additional or fewer components may be included in pixel cell 105-1. For example, in the illustrated embodiment, pixel cell 105-1 includes a plurality of photodiodes (e.g., first photodiode 107-1, second photodiode 107-2, third photodiode 107-3, and fourth photodiode 107-4). In some embodiments, the plurality of photodiodes may be arranged in a two-by-two array. However, in other embodiments, pixel cell 105-1 may include a different configuration of photodiodes (e.g., one, two, eight, sixteen, or more photodiodes). Similarly, there may be more or fewer transfer transistors or conversion gain capacitors depending, for example, on the number of photodiodes included in pixel cell 105-1 or the number of conversion gain modes.

In the illustrated embodiment transistors associated in pixel transistor circuitry of pixel cell 105-1 may be operable (e.g., configurable to an ON or a HIGH state, an OFF or a LOW state, or the like) via control signals (e.g., voltage or bias) applied or generated by control circuitry (e.g., control circuitry 110 illustrated in FIG. 1A). Control signals include a reset control signal $RST_{SIG}$ applied to reset gate electrode 121G, a voltage capacitance control signal $VCAP_{SIG}$ applied to a terminal (e.g., a lower electrode) of low conversion gain capacitor 117, a dual floating diffusion control signal $DFD_{SIG}$ applied to dual floating diffusion gate electrode 119G, a first transfer control signal $TX1_{SIG}$ applied to first transfer gate electrode 109-1, a second transfer control signal $TX2_{SIG}$ applied to second transfer gate electrode 109-2, a third transfer control signal $TX3_{SIG}$ applied to third transfer gate electrode 109-3, a fourth transfer control signal $TX4_{SIG}$ applied to fourth transfer gate electrode 109-4, and a row select control signal $RS_{SIG}$ applied to row select gate electrode 125G.

The first transfer transistor (e.g., associated with first transfer gate electrode 109-1) is coupled between first photodiode 107-1 and first floating diffusion 111. The second transfer transistor (e.g., associated with second transfer gate electrode 109-2) is coupled between second photodiode 107-2 and first floating diffusion 111. The third transfer transistor (e.g., associated with third transfer gate electrode 109-3) is coupled between third photodiode 107-3 and first floating diffusion 111. The fourth transfer transistor (e.g., associated with fourth transfer gate electrode 109-4) is coupled between fourth photodiode 107-4 and first floating diffusion 111. As illustrated, pixel cell 105-1 includes one or more photodiodes (e.g., first photodiode 107-1, second photodiode 107-2, third photodiode 107-3, and fourth photodiode 107-4) configured to photogenerate image charge in response to incident light. First floating diffusion 111 is coupled to receive the image charge from the one or more photodiodes (e.g., first photodiode 107-1, second photodiode 107-2, third photodiode 107-3, and/or fourth photodiode 107-4) through first transfer gate electrode 109-1, second transfer gate electrode 109-2, third transfer gate electrode 109-3, and fourth transfer gate electrode 109-4 (e.g., in response to transfer control signals $TX1_{SIG}$, $TX2_{SIG}$, $TX3_{SIG}$, and/or $TX4_{SIG}$).

First floating diffusion 111 is selectively coupled to second floating diffusion 113 based on a state of dual floating diffusion transistor 119 associated with dual floating diffusion gate electrode 119G (e.g., an ON or OFF state based on dual floating diffusion signal $DFD_{SIG}$). Put in another way, dual floating diffusion transistor 119 is coupled between the first floating diffusion 111 and the second floating diffusion 113 to function as switch (e.g., between conversion gain modes) to change an effective capacitance available to store image charge photogenerated by plurality of photodiodes 107. In embodiments, dual floating diffusion transistor 119 is coupled between first floating diffusion 111 and second floating diffusion 113. In some embodiments, dual floating diffusion transistor 119 may be referred as a conversion gain switch transistor or a switch transistor. When dual floating diffusion transistor 119 is off, pixel cell 105-1 operates in a high conversion gain mode and the amount of image charge available to be stored is based on first floating diffusion 111. Alternatively, when dual floating diffusion transistor 119 is on, pixel cell 105-1 operates in a low conversion gain mode and the amount of image charge available to be stored is based on the combined capacity of first floating diffusion 111 and second floating diffusion 113, or more specifically, low conversion gain capacitor 117. It is appreciated that capacitance of first floating diffusion 111 and second floating diffusion 113 (e.g., attributed, at least in part, to low conversion gain capacitor 117) may have different or varying capacitance ratios. In some embodiments, first floating diffusion 111 has a lower capacitance relative to second floating diffusion 113 or low conversion gain capacitor 117. As discussed previously, first floating diffusion 111 and second floating diffusion 113 may be utilized for different readout operational modes of pixel cell 105-1. Specifically, depending on a configuration of the pixel cell transistor circuitry included in pixel cell 105-1, an overall full well capacity of pixel cell 105-1 may be adjusted based on total capacitance available for charge storage. In some embodiments, pixel cell 105-1 and the associated image sensor includes at least two readout or conversion gain modes (e.g., a high conversion gain mode and a low conversion gain mode). It is appreciated that conversion gain is inversely related to capacitance and full well capacity of the pixel cell 105-1. Thus, to reduce conversion gain, first floating diffusion 111 may be coupled with second floating diffusion 113 to increase an overall effective capacitance (i.e., overall full well capacity) available for image charge storage. It is appreciated in some embodiments, a first available effective capacitance associated with readout under a high conversion gain readout mode (e.g., based on a first capacitance associated with a junction capacitor corresponding to first floating diffusion 111 providing a first charge storage capacity for storing image charge) is less than a second available effective capacitance associated with readout under a low conversion gain readout mode (e.g., based on a combination that includes the first capacitance and a second capacitance associated with the low conversion gain capacitor 117 that collectively provides a second charge storage capacity for storing image charge). In some embodiments, the second capacitance is greater than the first capacitance. It is appreciated that the first floating diffusion 111 (or corresponding junction capacitor) and the low conversion gain capacitor 117 facilitate switchable conversion gain operation of the SCG image sensor 100 determined by the DFD transistor gate signal $DFD_{SIG}$.

The reset transistor 121 (e.g., associated with reset gate electrode 121G) is coupled between a voltage source (e.g., voltage source AVDD) and second floating diffusion 113. First floating diffusion 111 is coupled to source-follower gate electrode 123G. Source-follower transistor 123 associated with source-follower gate electrode 123G is coupled between voltage source AVDD and a bitline 171-1 included in plurality of bitlines 171. Source-follower transistor 123 is configured to convert the image charge received at source-follower gate electrode 123G from first floating diffusion 111 and/or second floating diffusion 113 based, at least in part, on dual floating diffusion control signal $DFD_{SIG}$ to a corresponding voltage signal. Row select transistor 125 (e.g., associated with row select gate electrode 125G) is configured to send the corresponding voltage signal from the source-follower transistor 123 to bitline 171-1 included in the plurality of bitlines 171 in response to row select control signal $RS_{SIG}$.

Figure 1C:
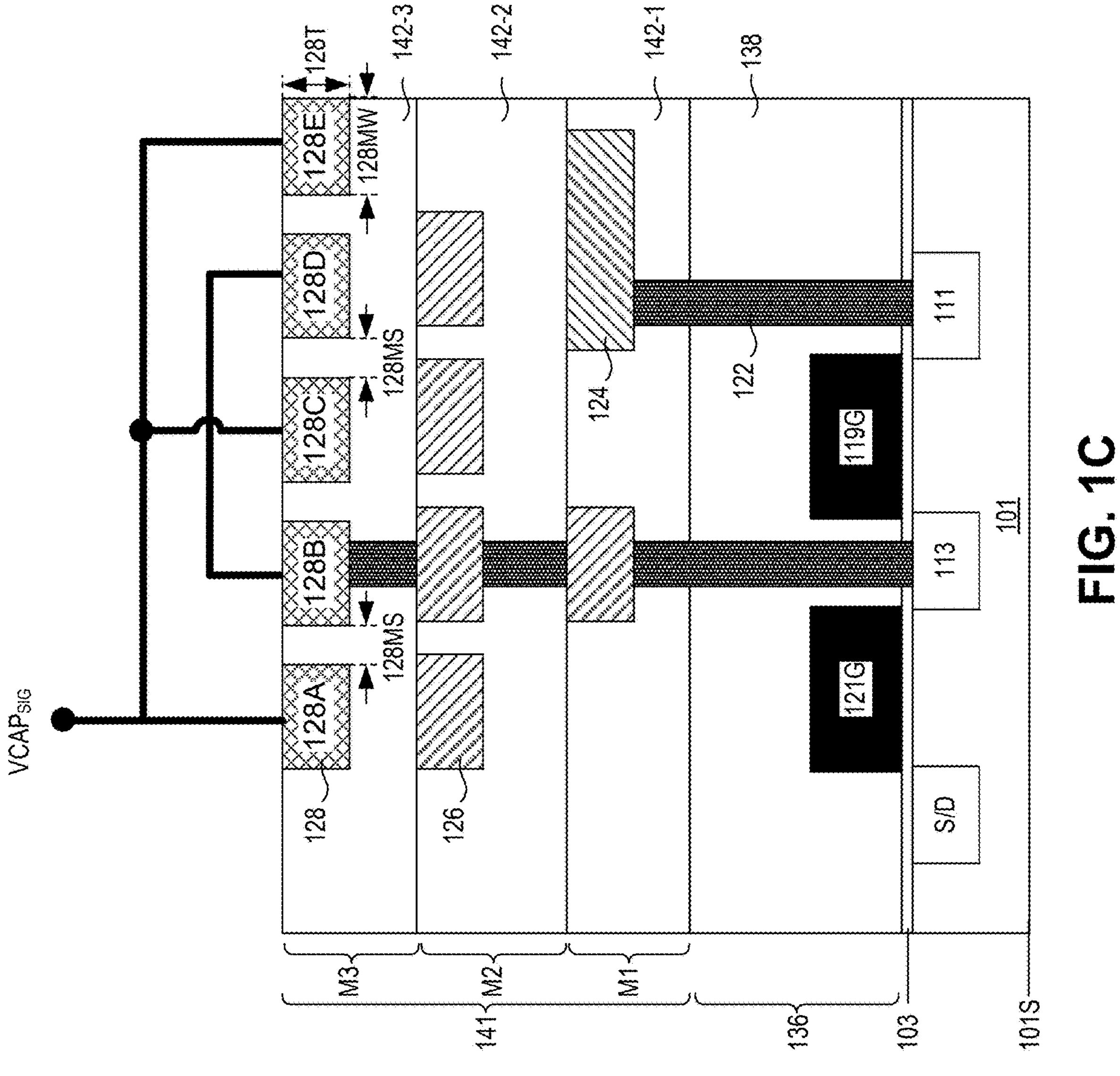
FIG. 1C illustrates an example cross-sectional view of the pixel cell illustrated in FIG. 1B, in accordance with an embodiment of the disclosure.

FIG. 1C illustrates an example cross-sectional view of pixel cell 105-1 illustrated in FIG. 1B, in accordance with an embodiment of the disclosure. Pixel cell 105-1 may comprise a stack of layers including semiconductor material 101, gate dielectric 103, interlayer dielectric region 136, and metallization region 141. In some embodiments, metallization region 141 includes at least three individual layers, including a first layer M1, a second layer M2, and a third layer M3. Gate dielectric 103 is disposed between interlayer dielectric region 136 and semiconductor material 101. Interlayer dielectric region 136 is disposed between gate dielectric 103 and metallization region 141.

Floating diffusions, source/drain regions, and photodiodes of pixel cell 105-1 correspond to doped regions disposed or formed within semiconductor material 101 (e.g., first floating diffusion 111, second floating diffusion 113, and source/drain regions S/D as illustrated). In some embodiments, semiconductor material 101 includes or is otherwise formed of silicon, a silicon germanium alloy, germanium, a silicon carbide alloy, an indium gallium arsenide alloy, any other alloys formed of III-V group compounds, combinations thereof, one or more epitaxial layers of the aforementioned materials, or a bulk substrate thereof. More specifically, semiconductor material 101 may correspond to any semiconductor material or combination of materials that may be doped or otherwise configured to facilitate the formation of an integrated circuit (e.g., individual circuitry components such as source/drain regions of transistors, memory elements, photodiodes, or the like). In one embodiment, semiconductor material 101 corresponds to an epitaxial layer (e.g., P-type silicon layer or N-type silicon layer). In such an embodiment, photodiodes (e.g., first photodiode 107-1, second photodiode 107-2, third photodiode 107-3, and fourth photodiode 107-4 illustrated in FIG. 1B or other photodiodes included in pixel cell 105-1 illustrated in FIG. 1B) may be formed in the epitaxial layer corresponding to semiconductor material 101.

It is appreciated that the term "photodiode" (e.g., first photodiode 107-1, second photodiode 107-2, and/or other photodiodes included in pixel cell 105-1 illustrated in FIG. 1B or the associated image sensor) correspond to a doped region (e.g., formed via implantation) disposed within or otherwise surrounded by an oppositely doped region to form a photosensitive area capable of photogenerating image charge in response to incident light. For example, first photodiode 107-1 and/or second photodiode 107-2 may correspond to an N-type semiconductor region (e.g., N-doped silicon region) disposed within a P-type semiconductor material (e.g., P-type doped silicon corresponding to semiconductor material 101). Accordingly, in some embodiments first photodiode 107-1, second photodiode 107-2, and other photodiodes included in pixel cell 105-1 or other pixel cells included in embodiments of the disclosure each includes a doped region that is oppositely doped (e.g., opposite conductivity type) relative to a doping type of semiconductor material 101. Other components formed within semiconductor material 101 such as first floating diffusion 111, second floating diffusion 113, source/drain regions, and the like correspond to doped regions (e.g., via implantation) disposed within semiconductor material 101.

In some embodiments, gate dielectric 103 includes one or more insulating materials (e.g., silicon dioxide, silicon oxynitride, hafnium dioxide, alumina oxide, zirconium oxide, or other gate dielectric materials known by one of ordinary skill in the art). Gate electrodes (e.g., dual floating diffusion gate electrode 119G and reset gate electrode 121G as illustrated) included in pixel cell 105-1 are disposed within interlayer dielectric region 136 proximate to gate dielectric 103. Gate dielectric 103 is disposed between the gate electrodes and semiconductor material 101. In some embodiments, gate electrodes included in pixel cell 105-1 formed within interlayer dielectric region 136 may include or otherwise correspond to a metal material (e.g., Au, Ag, Al, Cu, Ta, Ti, Nb, W, Mo), polycrystalline silicon (extrinsic or intrinsic), a silicide material, metal composites (e.g., WN, TiN, TaN, TiAl, TiAIC, other metal nitrides, RuOx, or other metal oxide electrode materials), other conductive materials with the appropriate conductivity and work function, or combinations thereof to facilitate image charge transfer. In some embodiments, gate electrodes formed within interlayer dielectric region 136 may be encapsulated by interlayer dielectric material 138, which may include one or more insulating materials (e.g., silicon dioxide, a tetraethylorthosilicate, a high density plasma oxide material, other insulating materials, or combinations thereof).

First layer M1 of metallization region 141 includes a plurality of metal wires 124 encapsulated, isolated by, or otherwise disposed within one or more insulating materials 142-1. Second layer M2 of metallization region 141 includes a plurality of metal wires 126 encapsulated, isolated by, or otherwise disposed within one or more insulating materials 142-2. Third layer M3 of metallization region 141 includes a plurality of metal wires 128 encapsulated, isolated by, or otherwise disposed within one or more insulating materials 142-3. It is appreciated that one or more vias (e.g., via 122) may couple plurality of metal wires included in metallization region 141 to various components of pixel cell 105-1 formed within interlayer dielectric region 136 and semiconductor material 101. In some embodiments, vias 122, plurality of metal wires 124, 126, and/or 128 include one or more metal materials (e.g., Au, Ag, Al, Cu, Ta, Ti, Nb, W, Mo, Ru, Co) or other conductive materials known in the art.

In the illustrated embodiment, metal wires 128 (e.g., metal wires 128A, 128B, 128-C, 128D, and 128E) included in layer M3 are used to form low conversion gain capacitor 117 for a given pixel cell illustrated in FIG. 1B. In other words, in some embodiments, low conversion gain capacitor 117 includes a metal-oxide-metal planar capacitor having a first electrode (e.g., including metal wires 128B and 128D) coupled to second floating diffusion 113 and second electrode (e.g., including metal wires 128A, 128C, and 128E) coupled to receive a capacitor bias $VCAP_{SIG}$ supplied by a voltage or reference source such as $V_{CAP}$. In some embodiments, the metal-oxide-metal planar-based capacitor is arranged to have its components (e.g., metal plate electrode) formed of metal wires 128 and respective portion(s) of one or more insulating materials 142-3 formed within a pixel region of the given pixel cell. In the same or different embodiments, the metal-oxide-metal planar-based capacitor may be located in a region that partly overlaps with a photo-sensitive area of the given pixel cell. It is appreciated that a capacitance associated with low conversion gain capacitor 117 (e.g. the illustrated metal-oxide-metal planar-based capacitor that includes metal wires 128 isolated by one or more insulating materials 142-3), is determined primarily by a corresponding metal width 128MW (e.g., along the x-direction or otherwise within the x-y plane), a corresponding metal length (e.g., into or out of the page along the Y direction or otherwise within the x-y plane), a corresponding metal thickness 128T (e.g., along the z-direction), respective portions of one or more insulating materials 142-3 disposed between metal wires 128, and metal spacing 128MS between adjacent metal wires included in metal wires 128 (e.g., separation distance between metal wire 128A and 128B, separation distance between metal wire 128B and 128C, separation distance between metal wire 128C and 128D, and so on, which may be along the x-direction).

As will be discussed, the design of low conversion capacitor 117 (e.g., fixed pattern, metal spacing, metal thickness, metal width, metal length, or other physical characteristics or dimensions) are changed on a zone-by-zone basis to compensate for fabrication variance and to improve uniformity (e.g., in terms of conversion gain, conversion gain ratio, capacitance, or other electrical characteristics associated with one or more conversion gain capacitors) across pixel cell array 105. Put in another zone, groups of the low conversion gain capacitor 117 or other conversion gain capacitors (e.g., junction capacitor associated with floating diffusion 111) are substantially (e.g., within technology node-based processing variation or limitations) identical within individual zones. It is appreciated that in some embodiments, the term metal thickness refers to a dimension of metal wires 128 along a direction (e.g., z-direction) perpendicular to a planar surface of semiconductor material 101 (e.g., light receiving surface 101S). In the same or other embodiments, the term metal width and metal length of metal wires 128 may be perpendicular to the metal thickness. In some embodiments, the term "length" corresponds to a longitudinal direction (i.e., lengthwise) that metal wires 128 propagate (e.g., into the page along the y-direction illustrated in FIG. 1C) while the term "width" corresponds to a side-to-side dimension perpendicular to the "length" of the metal wires 128. In such an embodiment, the length of metal wires 128 is greater than the width. It is further appreciated that the length of metal wires 128 may not be unidirectional (see, e.g., FIG. 2B) and thus may extend along multiple directions (e.g., along the x-direction, y-direction, or otherwise within the x-y plane). Similarly, the width of metal wires 128 is not limited to a single direction.

Figure 2A:
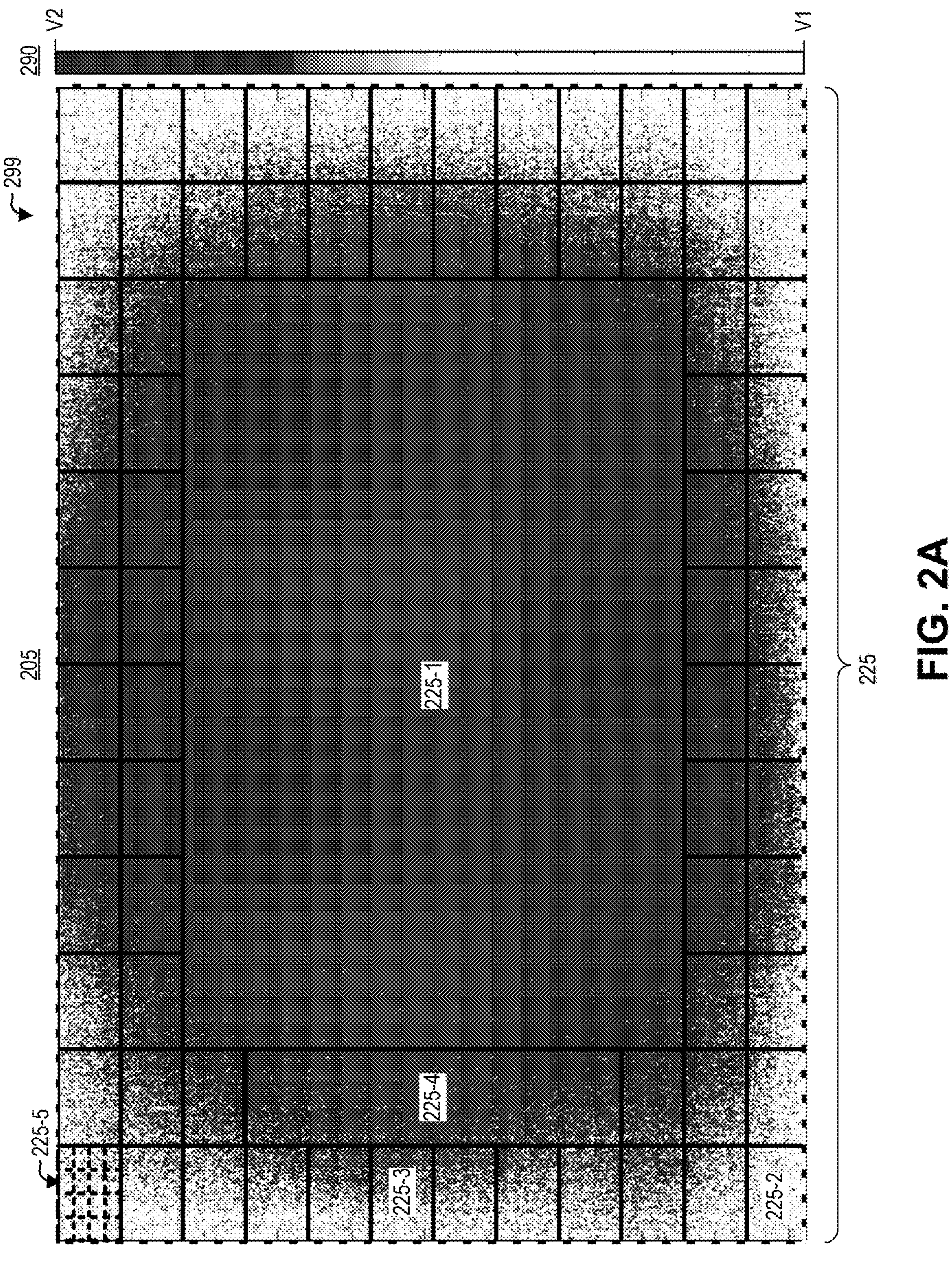
FIG. 2A illustrates an example pixel cell array segmented into a plurality of zones overlaid on a non-uniformity map, in accordance with an embodiment of the disclosure.

FIG. 2A illustrates an example pixel cell array 205 segmented into a plurality of zones 225 overlaid on a non-uniformity map 299 represented by scale 290, in accordance with an embodiment of the disclosure. Pixel cell array 205 is one possible implementation of pixel cell array 105 of switchable conversion gain image sensor 100 illustrated in FIG. 1A. Referring back to FIG. 2A, non-uniformity map 299 describes a performance ratio between conversion gain modes (e.g., a ratio relating a first conversion gain associated with the a high conversion gain mode to a second conversion gain associated with the low conversion gain mode on a pixel cell by pixel cell basis) across pixel cell array 205 when a same design or mask layout for one or more conversion gain capacitors (e.g., low conversion gain capacitor 117, a high conversion gain capacitor such as first floating diffusion 111, or the like included in individual pixel cells of pixel cell array 205) is used. As illustrated, when the same design across pixel cell array 205 for the one or more conversion gain capacitors are used, conversion gain performance across pixel cell array 205 may vary from V1 to V2 of scale 290 (e.g., in one example V2 represents unity or 1 and V1 represents less than unity such as 0.98 to illustrate a 2% performance deviation across pixel cell array 205).

However, in the illustrated embodiment, pixel cell array 205 is designed to have a performance ratio between conversion gain modes across pixel cell array 205 that is substantially uniform (e.g., less than 1% variance). It is appreciated that the variance or ratio across pixel cell array 205 depicted by non-uniformity map 299 may represent performance characteristics (e.g., conversion gain, capacitance, or the like) between conversion gain modes (e.g., high conversion gain mode with respect to low conversion gain mode on an individual pixel cell by pixel cell basis) or for individual conversion gain modes (e.g., low conversion gain mode) that may or may not be normalized. More specifically, pixel cell array 205 is segmented into a plurality of zones 225 (e.g., zone 225-1, 225-2, 225-3, 225-4, 225-5, and so on) with the one or more conversion capacitors of individual pixel cells included in a given zone designed on a zone-by-zone basis to compensate for fabrication and/or performance variance. For example, a given zone included in plurality of zones 225 have multiple pixel cells (see, e.g., zone 225-5 with individual pixel cells annotated by dashed lines that may each correspond to respective instances of pixel cell 105-1 illustrated in FIG. 1B) with each pixel cell within the given zone including one or more conversion gain capacitors having the same design and resulting in substantially similar physical capacitor structure. However, conversion gain capacitors located in different zones may have different designs relative to one another (e.g., in terms of fixed pattern layout, metal spacing, metal thickness, or combinations thereof) to promote performance unity across pixel cell array 205. In other words, the design of the one or more conversion gain capacitors (e.g., low conversion gain capacitor 117 and/or the high conversion gain capacitor corresponding to or associated with first floating diffusion 111 illustrated in FIG. 1B for each instance of an individual pixel cell within a given zone) compensates, on a zone-by-zone basis, for fabrication and/or performance variance across pixel cell array 205. In such a manner, a switchable conversion gain image sensor with a performance ratio approaching unity (e.g., less than 1% represented by a normalized ratio from 1.00 to 0.99) may be achieved.

However, it is appreciated that fabrication variance and resulting performance variance may be dependent on a variety of factors such as processing conditions, processing capability, fabrication procedure, technology node, and the like. For example, in the illustrated embodiment, non-uniformity map 299 shows individual pixel cells within a central portion (see, e.g., zone 225-1) of pixel cell array 205 having relatively consistent performance (e.g., substantially uniform conversion gain ratio) that degrades or otherwise deviates towards a perimeter boundary of pixel cell array 205 (e.g., from zone 225-1 toward zones 225-2 and 225-3). Thus, in some embodiments, pixel cell array 205 may be segmented into plurality of zones 225 that have the same or different zone size or zone shape to compensate for fabrication induced performance variance. In the illustrated embodiment, zone 225-1 corresponds to a first zone centrally located within pixel cell array 205 and zones 225-2, 225-3 correspond to second and third zones positioned adjacent to edges of pixel cell array 205. As illustrated, a first lateral area of zone 225-1 is greater than a second lateral area of zone 225-2 and a third lateral area of zone 225-3. The illustrated embodiment also includes a zone 225-4 having a fourth lateral area greater than the second and third lateral areas of zones 225-2 and 225-3 but less than the first lateral area of zone 225-1. In the illustrated embodiment, zone 225-4 is disposed between zone 225-1 and zone 225-3.

It is appreciated that the specific segmentation of pixel cell array 205 into plurality of zones 225 illustrated in FIG. 2A is one possible example of how pixel cell array 205 could be segmented with different zones having different designs for one or more conversion gain capacitors included in individual pixel cells of a given zone to compensate for fabrication and/or performance variance. In other embodiments a different configuration of plurality of zones 225 (e.g. with more zones, less zones, different zone sizes, different zone shapes, or the like) may be utilized and otherwise determined based on an iterative design approach (see, e.g., FIG. 3A).

Figure 2B:
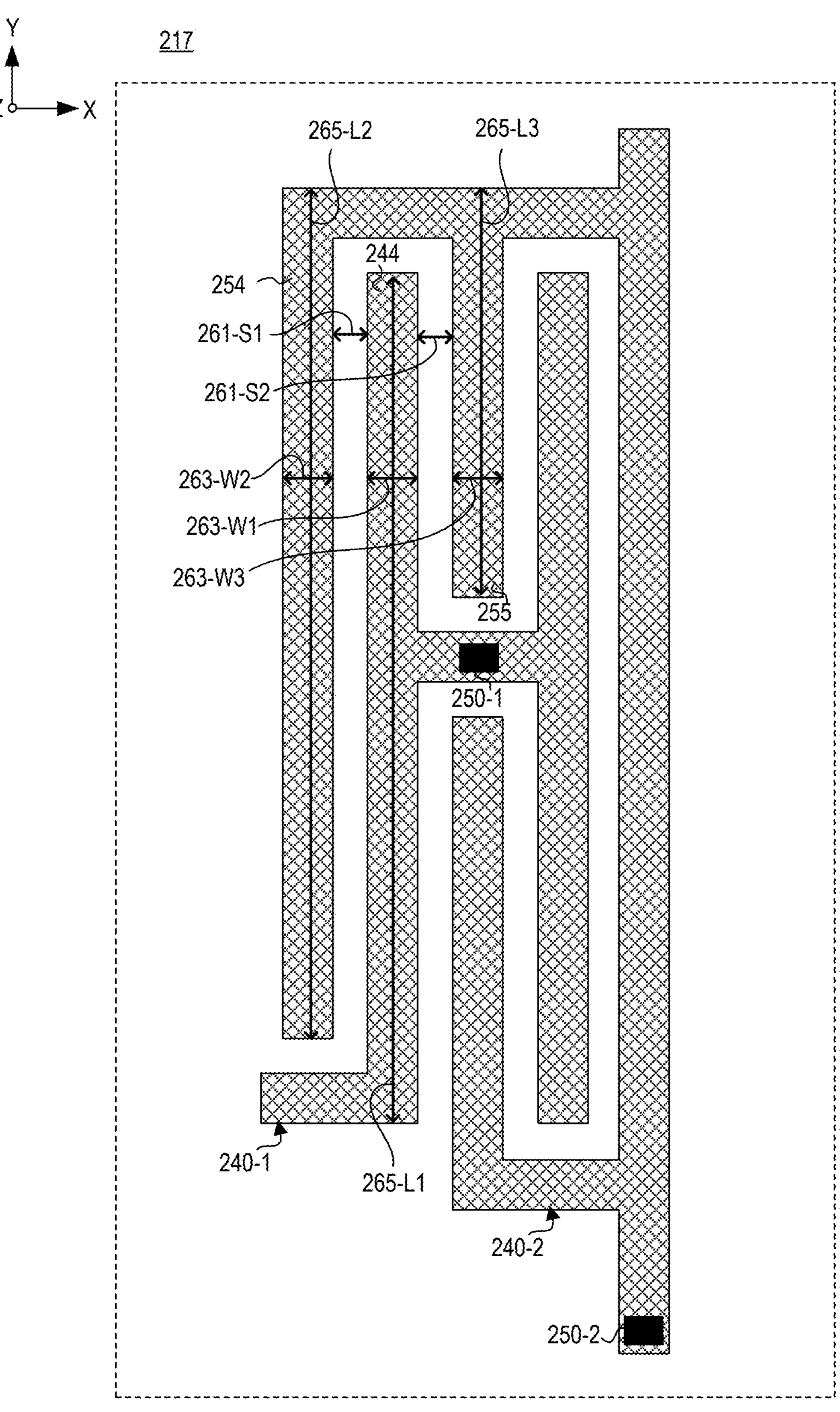
FIG. 2B illustrates a top view of a low conversion gain capacitor that may have a different design depending on a location within the pixel cell array illustrated in FIG. 2A, in accordance with an embodiment of the disclosure.

FIG. 2B illustrates a top view of an example design of a low conversion gain capacitor 217 (e.g., a metal-oxide-metal planar capacitor formed in layer M3 illustrated in FIG. 1C) that may have a different design depending on a location within pixel cell array 205 illustrated in FIG. 2A, in accordance with an embodiment of the disclosure. Put in another way, low conversion gain capacitor 217 is one possible implementation of low conversion gain capacitor 117 illustrated in FIG. 1B and may have a zone dependent design to improve conversion gain ratio uniformity across pixel cell array 205.

In the illustrated embodiment, low conversion gain capacitor 217 is a metal-oxide-metal capacitor (e.g., a planar capacitor formed in one or more layers of a metallization region such as layer M3 of metallization region 141 illustrated in FIG. 1C) including a first electrode 240-1 interdigitated with a second electrode 240-2. In some embodiments, layer M3 of metallization region 141 illustrated in FIG. 1C represents an exemplary x-z cross-sectional structure to low conversion gain capacitor 217. In some embodiments, first electrode 240-1 and second electrode 240-2 are electrically isolated or otherwise separated from one another by an insulating material (e.g., an intermetal dielectric such as silicon dioxide). In some embodiments, capacitance of low conversion gain capacitor 217 is determined by a fixed pattern layout, a metal width, a metal length, a metal spacing, or a metal thickness, each of which may be varied individually or in combination on a zone-by-zone basis to compensate for fabrication induced performance variance. In some embodiments, first electrode 240-1 and second electrode 240-2 are coupled to respective contacts 250-1 and 250-2 (e.g., to couple one electrode to a voltage or reference source such as $V_{CAP}$ illustrated in FIG. 1B and the other electrode to a node selectively coupled with a high conversion gain capacitor such as first floating diffusion 111 illustrated in FIG. 1B).

As illustrated, low conversion gain capacitor 217 includes first electrode 240-1 and second electrode 240-2 that form interdigitated fingers (e.g., fingers 244, 254, and 255) within a metallization region of the SCG image sensor (e.g., layer M3 of metallization region 141 illustrated in FIG. 1C). In the same or other embodiments, at least one of a metal thickness (e.g., 128T illustrated in FIG. 1C) of the interdigitated fingers or a metal spacing (e.g., 128MS illustrated in FIG. 1C and/or 261-S1 or 261-S2 illustrated in FIG. 2B) between adjacent fingers included in the interdigitated fingers vary on the zone-by-zone basis. In some embodiments, the metal thickness of individual fingers and the metal spacing between adjacent fingers for the low conversion gain capacitor 217 within individual zones of the plurality of zones is substantially identical. As illustrated, first electrode 240-1 includes finger 244 disposed between fingers 254 and 255 of second electrode 240-2. Finger 244 has a width of 263-W1, finger 254 has a width of 263-W2, and finger 255 has a width of 263-W3 (e.g., along an x-direction). Fingers 244, 254, and 255 extend parallel to one another (e.g., perpendicular to widths 263-W1, 263-W2, and/or 263-W3) with finger 244 separated from finger 254 by separation distance 261-S1 along the x-direction (e.g., parallel to widths 263-W1, 263-W2, and/or 263-W3) and finger 244 is further separated from finger 255 by separation distance 261-S2 (e.g., parallel to widths 263-W1, 263-W2, and/or 263-W3). Along the y-direction, finger 244 is further characterized by a length 265-L1 (e.g., perpendicular to and greater than width 263-W1), finger 254 is further characterized by length 265-L2 (e.g., perpendicular to and greater than width 263-W2), and finger 255 is further characterized by length 265-L3 (e.g., perpendicular to and greater than width 263-W3). It is further appreciated that fingers 244 254, and 255 and, more generally, first electrode 240-1 and second electrode 240-2, are also characterized by respective thicknesses (e.g., along the z-direction).

To compensate for fabrication and/or performance variance, a fixed pattern layout, a metal spacing, a metal thickness, a metal width, a metal length, or other physical dimensions of low conversion gain capacitor 217 may be varied individually or in combination on a zone-by-zone basis. The fixed pattern layout corresponds to an overall pattern formed by first electrode 240-1 and second electrode 240-2. For example, completely different layouts may be utilized to form the basis of different low conversion gain capacitors in different zones. In other embodiments, the degree of overlap or amount fingers extend parallel to one another may be adjusted by changing a length of a given finger (e.g. lengths 265-L1, 265-L2, and/or 265-L3 may be adjusted to adjust capacitance) to change the fixed pattern layout of a given low conversion gain capacitor. Metal spacing corresponds to the separation distance between interdigitated fingers (e.g., separation distance 261-S1 and 261-S2 may be adjusted depending on a zone location). Metal width corresponds to a width of a given finger or metal interconnect (e.g., width 263-W1, 263-W2, and/or 263-W3 may be adjusted depending on a zone location). Metal length corresponds to a longitudinal direction the interdigitated fingers extend (e.g., lengthwise such as 265-L1, 265-L2, and 265-L3). Metal thickness corresponds to depthwise direction (e.g., z-direction) first electrode 240-1 and second electrode 240-2 extend into a layer of the metallization region (e.g., layer M3 illustrated in FIG. 1C). In one embodiment, specific configurations or adjustments to low conversion gain capacitor 217 may be based on process feedback (e.g., based on a non-uniformity map that describes a high conversion gain to low conversion gain ratio across a pixel cell array). In some embodiments, adjustments made for spacing or thickness of fingers included in low conversion gain capacitor 217 are done on a zone-by-zone basis and may be iterative or incremental (e.g., ±3 nm or other pre-determined amount).

Figure 3A:
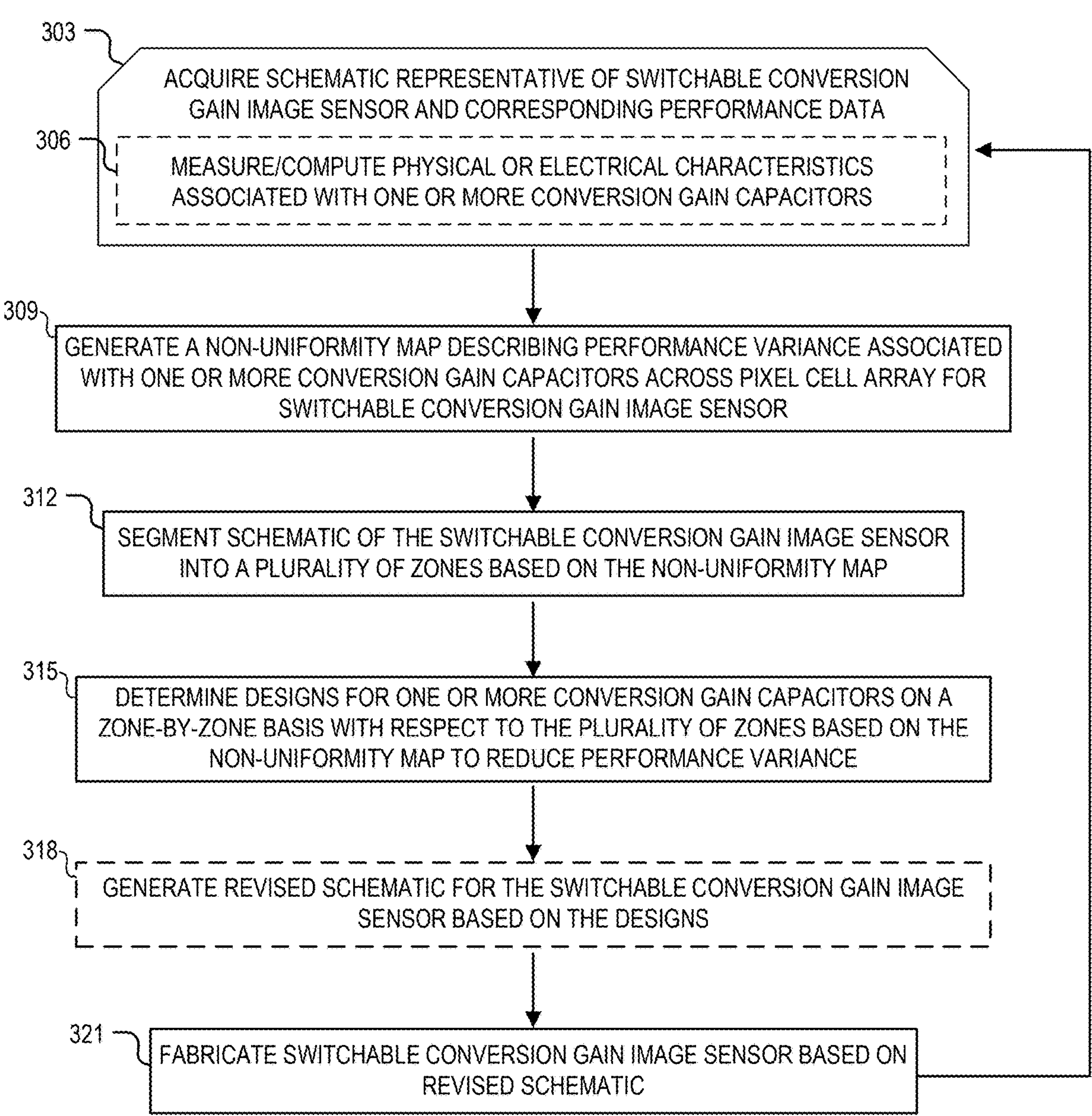
FIG. 3A is an example flow chart illustrating method for generating a design for a switchable conversion gain image sensor with improved uniformity, in accordance with an embodiment of the disclosure.

FIG. 3A is an example flow chart illustrating method 300 for generating a design for a switchable conversion gain image sensor with improved uniformity, in accordance with an embodiment of the disclosure. Method 300 may be utilized to generate a design for the image sensor 100 illustrated in FIGS. 1A-1B and/or pixel cell array 205 illustrated in FIGS. 2A-2B. The order in which some or all of the process blocks appear in method 300, which includes blocks 303, 306, 309, 312, 315, 318, and 321 should not be deemed limiting. Rather, one of ordinary skill in the art having the benefit of the present disclosure will understand that some of the process blocks may be executed in a variety of orders not illustrated, or even in parallel. Additionally, blocks may be added to, or removed from, method 300 in accordance with the teachings of the present disclosure. More generally, the blocks of method 300 illustrated in FIG. 3A may correspond to operations for image sensor design, which may be stored as instructions within one or more non-transitory machine-accessible storage mediums that when executed by a machine (e.g., an imaging system, a processing system, a processor, an ASIC processor, or otherwise) will cause the machine to perform the operations for image sensor design and/or analysis.

Block 303 illustrates acquiring a schematic representative of a switchable conversion gain (SCG) image sensor and corresponding performance data characterizing the SCG image sensor. In some embodiments, the schematic may correspond to a mask layout design file (e.g., CIF, GDSII, OASIS, or other integrated circuit mask layout formats) or other digital representation of the switchable conversion gain (SCG) image sensor in whole or in part. In one embodiment, the schematic corresponds to a partial representation of the SCG image sensor (e.g., representative of one or more conversion gain capacitors) or otherwise provides information related to the layout of the SCG image sensor. In the same or other embodiments, the corresponding performance data physically and/or electrically characterizes the schematic (e.g., the SCG image sensor or its digital representation). More generally, the corresponding performance data corresponds to a representation of variance (e.g., fabrication variance, performance variance, or the like) across the SCG image sensor. The variance may be inferred, calculated, and/or measured from corresponding performance data in embodiments of the disclosure.

In some embodiments, the SCG image sensor includes a pixel cell array including a plurality of individual pixel cells arranged in rows and columns. The individual pixel cells include one or more photodiodes, one or more conversion gain capacitors (e.g., a high conversion gain capacitor such as a floating diffusion, a low conversion gain capacitor such as a metal-oxide-metal capacitor, and the like), and associated circuitry to facilitate switchable conversion gain operation of the SCG image sensor. In such an embodiment, the corresponding performance data includes at least one of physical characteristic data for the pixel cell array representative of the one or more conversion gain capacitors included in each of the individual pixel cells and/or electrical characteristic data for the pixel cell array representative of the one or more conversion gain capacitors included in each of the individual pixel cells.

Figure 3B:
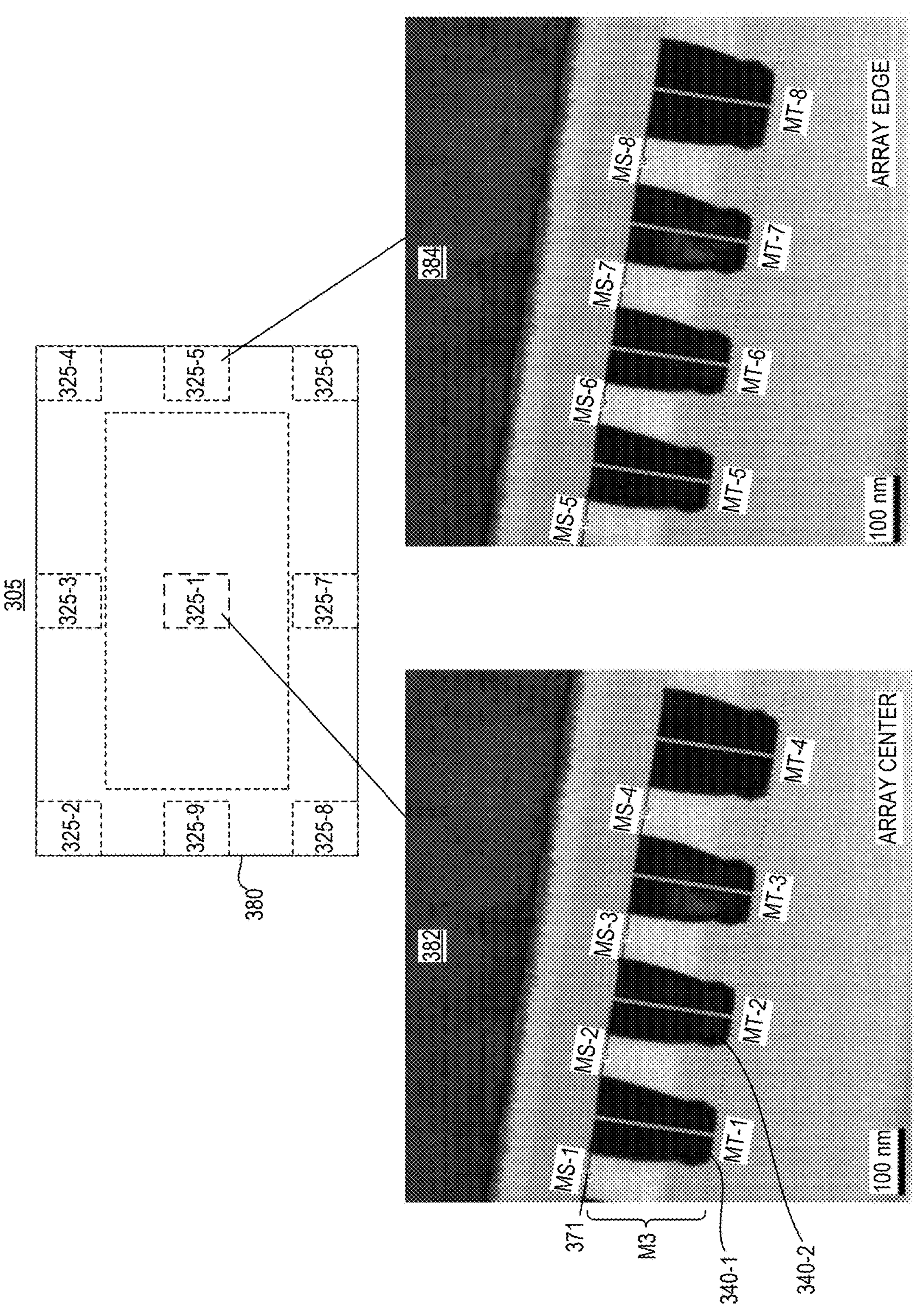
FIG. 3B illustrates images of low conversion gain capacitors included in a pixel cell array, in accordance with an embodiment of the disclosure.

The physical characteristic data may include images (e.g., scanning electron microscopy images, transmission electron microscopy images, or the like) characterizing the one or more conversion gain capacitors at various locations within the pixel cell array (see, e.g., FIG. 3B). In the same or other embodiments, the physical characteristic data may include measurements of physical features for the one or more conversion gain capacitors (e.g., fixed pattern layout measurements, metal spacing measurements, metal width measurements, metal length measurements, metal thickness measurements, or other measurable physical characteristics describing corresponding structures such as metal plate electrodes associated with the one or more conversion gain capacitors) across the pixel cell array. The electrical characteristic data may include electrical measurements (e.g., determined via a contact probe test, actual operation of the switchable conversion gain image sensor, or the like) characterizing performance of the switchable conversion image sensor associated with the one or more conversion gain capacitors (e.g., capacitance measurements of the one or more conversion gain capacitors, conversion gain measurements for the conversion gain modes of the SCG image sensor, image signals, or other characteristic performance metrics representative of the one or more conversion gain capacitors of the SCG image sensor on an individual pixel cell basis across the pixel cell array). In general, it is appreciated that the physical and/or electrical characteristic data provide (e.g., directly or indirectly) sufficient information regarding performance associated with the one or more conversion gain capacitors of individual pixel cells across the pixel cell array. In other words, in some embodiments the physical and/or electrical characteristic data describes changes in performance across the pixel cell array that are due, at least in part, to fabrication variance.

Block 306 is an optional block showing measuring or computing physical or electrical characteristics associated with one or more conversion gain capacitors across the pixel cell array to determine the corresponding performance data or otherwise identify variations in performance (e.g., electrical or physical characteristics) across the pixel cell array of the SCG image sensor attributed to fabrication variance or inconsistencies. For example, images (e.g., scanning electron microscopy images, transmission electron microscopy images, or the like) may be used to compute the physical characteristic data of the one or more conversion gain capacitors (e.g., the low conversion gain capacitor) across the pixel cell array. It is appreciated that physical measurements at various points across the pixel cell array may be utilized to calculate actual dimensions of the one or more conversion gain capacitors components (e.g., metal width, spacing, thickness, or other dimensions that may be able to be measured), which can be subsequently used to calculate or estimate capacitance associated with the one or more conversion gain capacitors, conversion gain, or other electric characteristic data associated with the one or more conversion gain capacitors across the pixel cell array. In one embodiment, block 306 includes measuring a metal thickness, a metal spacing, a metal length, a metal width, or other physical dimensions for the low conversion gain capacitor included in the individual pixel cells across the pixel cell array.

In another example, electrical measurements of the SCG image sensor (e.g., capacitance measurements of the one or more conversion gain capacitors, conversion gain measurements for the conversion gain modes of the SCG image sensor, image signals, or other characteristic performance metrics representative of the one or more conversion gain capacitors of the SCG image sensor on an individual pixel cell basis across the pixel cell array) may be measured to determine the electrical characteristic data. In one embodiment, at least one of a capacitance of a low conversion gain capacitor included in each of the individual pixel cells of the pixel cell array or a conversion gain associated with the low conversion gain capacitor included in each of the individual pixel cells of the pixel cell array is measured or otherwise computed to identify variations across the pixel cell array.

Block 309 shows generating a non-uniformity map describing performance variance across the pixel cell array for the SCG image sensor based on the corresponding performance data (e.g., the measured or computed physical or electrical characteristics associated with the one or more conversion gain capacitors). It is appreciated that the non-uniformity map may describe performance variance between conversion gain modes among pixel cells across the pixel cell array for the SCG image sensor. For example, the non-uniformity map may include a performance ratio for each of the individual pixel cells included in the pixel cell array (e.g., ratio between conversion gain, capacitance, or the like) between various conversion gain modes for readout. Non-uniformity map 299 illustrated in FIG. 2A provides an example of block 309, which describes a normalized conversion gain ratio across pixel cell array 205. Specifically, non-uniformity map 299 represents a normalized ratio of high conversion gain to low conversion gain for individual pixel cells across pixel cell array 205, which is representative of fabrication induced performance variance (e.g., when the same design for one or more conversion gain capacitors is used across the pixel cell array).

Referring back to FIG. 3A, in some embodiments the SCG image sensor includes a high conversion gain mode and a low conversion gain mode associated with the one or more capacitors and the non-uniformity map relates variation in performance across the pixel cell array between the high conversion gain mode and the low conversion gain mode for the individual pixel cells. In one example, the non-uniformity map includes a conversion gain ratio between the high conversion gain mode and the low conversion gain mode for each of the individual pixel cells across the pixel cell array, which may be computed, at least in part, from the corresponding performance data. In the same or other embodiments, the one or more conversion gain capacitors of the SCG image sensor include a floating diffusion for the high conversion gain mode and a low conversion gain capacitor for the low conversion gain mode. In the same embodiment, the non-uniformity map includes a capacitance ratio based, at least in part, on corresponding capacitances of the floating diffusion or the low conversion gain capacitor for the individual pixel cells. More generally, variations in measured or computed physical or electrical characteristics associated with one or more conversion gain capacitors across the pixel cell array (e.g., metal spacing, metal thickness, capacitance and/or conversion gain for one or more conversion gain capacitors included in individual pixel cells) may be used to generate a non-uniformity map describing performance variance across the pixel cell array.

Block 312 illustrates segmenting the schematic of the SCG image sensor or other representation of the pixel cell array by dividing the pixel cell array into a plurality of zones based on the non-uniformity map. In some embodiments, the number of zones included in the plurality of zones and the size of individual zones are determined by determining a ratio difference with the non-uniformity map. For example, as illustrated in FIG. 2A, individual pixel cells with relatively uniform differences in performance (e.g., regions within the pixel cell array within a deviation threshold from one another based on the non-uniformity map 299) may be grouped together into a common zone identified as having a same design for one or more conversion gain capacitors. In one embodiment, a ratio difference is determined (e.g., a reference value within the non-uniformity map 299 for a first pixel cell is compared to corresponding values of the non-uniformity map associated with increasingly farther away pixel cells relative to the first pixel cell until a deviation threshold for the ratio difference is reached). In other words, in some embodiments, the schematic of the SCG image sensor is divided into the plurality of zones based on a deviation threshold within individual zones included in the plurality of zones with respect to the non-uniformity map. In one embodiment, an initial deviation threshold such as 0.4% may be set for the inner-most or central zone and an outermost zone may have a maximal deviation threshold, for example 2% in the illustrated embodiment. It is appreciated that the number of zones may then be determined by incrementing the range of deviation from the initial deviation threshold to the maximal deviation threshold.

It is appreciated that individual zones included in the plurality of zones may have the same or different sizes. In some embodiments, each of the individual zones include or otherwise span two or more individual pixel cells included in the pixel cell array. In some embodiments, the plurality of zones may include a first zone having a first lateral area and a second zone having a second lateral area less than the first lateral area. In some embodiments, the first zone is centrally located within the pixel cell array and the second zone is located along a periphery or perimeter boundary of the pixel cell array. In some embodiments, the first zone and the second zone have different shapes such as square-shaped, rectangular, circular, oval, and the like, defined by pixel selection based on a deviation threshold. In some embodiments, the number of zones and the size of individual zones included in the plurality of zones is based on the non-uniformity map such that regions of the pixel cell array that are similarly affected by fabrication variance (e.g., have similar performance) may be grouped together to address the fabrication variance and subsequent performance variance that affects the regions of the pixel cell array. In such a manner, design of the one or more conversion capacitors may be adjusted or generated to compensate for fabrication variance to achieve performance unity throughout the pixel cell array.

Block 315 shows generating designs for the one or more conversion gain capacitors included in the individual pixel cells of the pixel cell array on a zone-by-zone basis with respect to the plurality of zones based, at least in part, on the non-uniformity map to reduce the performance variance. In some embodiments, the one or more conversion gain capacitors include a low conversion gain capacitor for each individual pixel cell. In such an embodiment, the low conversion gain capacitor is a metal-oxide-metal capacitor formed within a metallization region on the semiconductor material that may be adjusted in terms of fixed pattern design, metal spacing, and/or metal thickness to compensate for performance variance. It is appreciated that the design for each of the one or more conversion gain capacitors, including the low conversion gain capacitor, included in individual pixel cells within a given zone included in the plurality of zones is the same. For example, each low conversion gain capacitor within a given zone may have the same layout and/or mask design. Put in another way, the design (e.g., in terms of fixed pattern design, metal width, metal length, metal spacing, and/or metal thickness) for the one or more capacitors within different zones may be different.

In some embodiments, the designs for the one or more conversion gain capacitors include a first design associated with a first zone included in the plurality of zones and a second design associated with a second zone included in the plurality of zones. In the same embodiments, the one or more conversion gain capacitors having the first design within the first zone included in the plurality of zones is fabricated with substantially similar physical structure (e.g., in terms of shape, spacing between adjacent metal plate electrode, respective metal width, or respective metal thickness) within manufacturing tolerance, and the one or more conversion gain capacitors having the second design within the second zone included in the plurality of zones is fabricated with substantially similar physical structure (e.g., in terms of shape, spacing between adjacent metal plate electrode, respective metal width, or respective metal thickness) within manufacturing tolerance. In the same embodiment, the first design is different from the second design (e.g., based on at least one of a fixed pattern layout, a metal spacing, a metal width, metal length, and/or a metal thickness of the low conversion gain capacitor). In some embodiments, the first zone is centrally located within the pixel cell array and the second zone is positioned adjacent to an edge of the pixel cell array. In the same or other embodiments, a first lateral area of the first zone is greater than a second lateral area of the second zone.

In an embodiment, the designs for the one or more conversion gain capacitors (e.g., the low conversion gain capacitor) are adjusted based on the non-uniformity map. For example, a same fixed pattern design for the low conversion gain capacitor may be used throughout the pixel cell array, but a separation distance or metal thickness may be adjusted based on a ratio difference extracted from the non-uniformity map. In one embodiment, the non-uniformity map represents a conversion gain ratio between conversion gain modes (e.g., high conversion gain relative to low conversion gain), a capacitance ratio (e.g., an estimated or actual capacitance relative of a low conversion gain capacitor relative to an expected or theoretical capacitance of the low conversion gain capacitor), or other ratio associated with the one or more conversion capacitors of individual pixel cells throughout the pixel cell array. Differences between values of the non-uniformity map may then be used to estimate or otherwise determine how much the design of the one or more conversion gain capacitors should be adjusted (e.g., a greater difference indicates a greater change in design). For example, in one embodiment, generating the designs for the one or more conversion gain capacitors may include determining spacing adjustment information (e.g., separation distance between individual fingers of the low conversion gain capacitor) for each zone based on the differences in values (e.g., ratio differences) for different zones included in the plurality of zones.

In general, it is appreciated that the designs of the one or more conversion gain capacitors are updated to compensate for performance variance across the pixel cell array associated with or otherwise induced by fabrication variance based on the non-uniformity map. In other words, the design of the one or more capacitors is decoupled from the design of the pixel cell such that the pixel cell array may include different designs (e.g., on a zone-by-zone basis) to achieve a performance ratio between conversion gain modes near unity across the pixel cell array. In such a way, an improved SCG image sensor may be achieved that uses different designs of one or more conversion gain capacitors on a zone-by-zone basis to compensate for limitations in accuracy of conventional fabrication processes.

Block 318 illustrates generating a revised schematic of the SCG image sensor based on the designs. In some embodiments, the revised schematic may be generated by updating the schematic initially acquired in block 303. In such a manner a design for an SCG image sensor with improved conversion gain ratio uniformity based on the designs generated in block 315 may be determined. In some embodiments, the revised schematic may correspond to a mask layout design file (e.g., CIF, GDSII, OASIS, or other integrated circuit mask layout formats). Compared to conventional fixed pattern pixel design, in some embodiments, metal trace (e.g., line or wire) length, separation distance, or thickness parameters for the low conversion gain capacitor may be adjusted based on parameter(s) input from Block 315 for different zones in the pixel cell array to generate a revised schematic yielding a gradual transition from pixel cells located in central zones to pixel cells located in outer zones.

Block 321 shows fabricating a revised SCG image sensor based on the revised schematic. It is appreciated that the revised SCG image sensor may correspond to image sensor 100 illustrated in FIGS. 1A-1C and/or otherwise include pixel cell 205 illustrated in FIGS. 2A-2B. In some embodiments, the low conversion gain capacitors included in the one or more capacitors of the pixel cell array for the revised SCG image sensor vary on a zone-by-zone basis based on the designs.

In some embodiments, the revised SCG image sensor may be characterized and block 321 proceeds back to block 303 such that method 300 may be repeated. In such an embodiment, an iterative process may occur in which the SCG image sensor is repeatedly characterized, a non-uniformity map is generated, and designs for the one or more conversion gain capacitors are updated until a schematic with a ratio uniformity of near unity is achieved or otherwise found to within a threshold range.

FIG. 3B illustrates images 382 and 384 of low conversion gain capacitors included in pixel cell array 305, in accordance with an embodiment of the disclosure. It is appreciated that the images 382 and 384 are example images (e.g., scanning electron microscopy images) of an SCG image sensor that may correspond to or otherwise be included in corresponding performance data (e.g., of block 303 illustrated in FIG. 3A) that may be used to calculate separation distance (e.g., MS-1, MS-2, MS-3, MS-4, MS-5, MS-6, MS-7, or MS-8) between electrodes (e.g., first electrode 340-1 and second electrode 340-2) or fingers included in the low conversion gain capacitors (e.g., low conversion gain capacitor 217 of FIG. 2B) formed within a metallization region (e.g., within layer M3) of the SCG image sensor. In the same or other embodiments, images 382 and 384 may also be used to calculate or measure metal thickness (e.g., vertical or depthwise thickness MT-1, MT-2, MT-3, MT-4, MT-5, MT-6, MT-7, or MT-8) of electrodes or fingers included in the low conversion gain capacitors. In such a manner, variance in characteristics of the one or more conversion gain capacitors associated with the fabrication process may be physically determined or measured at various locations of pixel cell array 305 (e.g., within zones 325-1, 325-2, 325-3, 325-4, 325-6, 325-7, 325-8, and/or 325-9) to generate a non-uniformity map describing pixel cell array 305. It is appreciated that measurements may occur anywhere within pixel cell array 305 (e.g., within a central located zone 325-1, any zone located along a perimeter 380 of pixel cell array 305 proximate to the central located zone 325-1 such as zones 325-2, 325-3, 325-4, 325-6, 325-7, 325-8, 325-9, or elsewhere within pixel cell array 305).

Figure 3C:
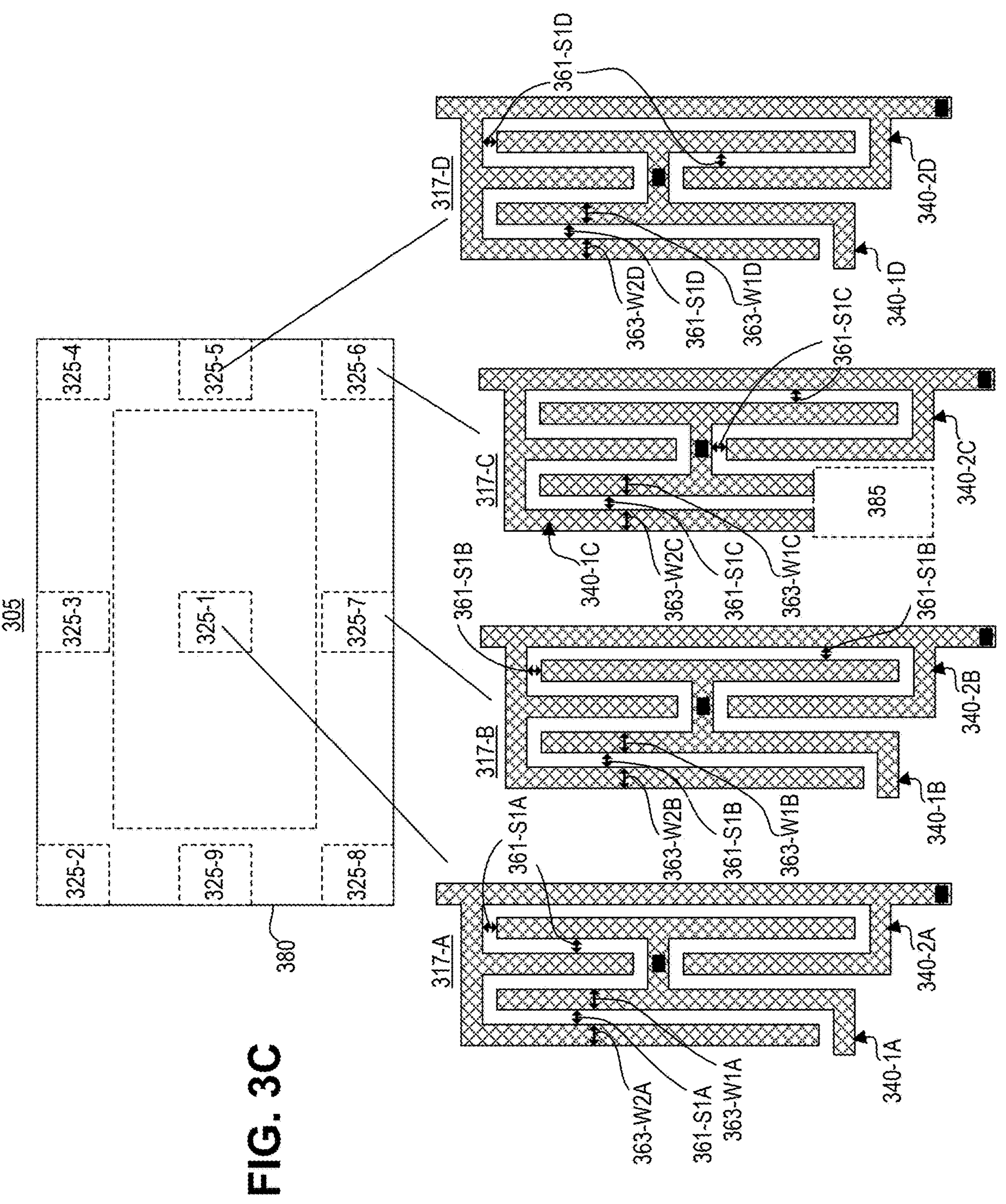
FIG. 3C illustrates examples of designs for different low conversion gain capacitors located in different zones included in a plurality of zones that segment a pixel cell array, in accordance with embodiments of the disclosure.

FIG. 3C illustrates examples of designs for different low conversion gain capacitors (e.g., metal-oxide-metal capacitors) located in different zones included in plurality of zones 325 that segment pixel cell array 305, in accordance with embodiments of the disclosure. It is appreciated that plurality of zones 325 illustrated in FIG. 3B and FIG. 3C are example zones included in a plurality of zones that segment the image sensor (e.g., in accordance with method 300 illustrated in FIG. 3A). It is further appreciated that not all zones included in plurality of zones 325 is necessarily labels or otherwise illustrated. Indeed, there may be intermediate zones (e.g., disposed between a central zone such as 325-1 and outer zones such as 325-2 through 325-9) that are omitted for clarity. Additionally, it is appreciated that there may be fewer or more zones than illustrates having the same or difference sizes and/or shapes.

Referring back to FIG. 3C, it is appreciated that the design of the different low conversion gain capacitors is configured to compensate for fabrication induced performance variance (e.g., to improve conversion gain ratio uniformity). In some embodiments, low conversion gain capacitors 317-A, 317-B, 317-C, and 317-D represent possible implementations of low conversion gain capacitor 217 illustrated in FIG. 2B and/or represent different designs generated in block 315 of method 300 illustrated in FIG. 3A resulting in different physical capacitor structures (e.g., that differ at least in terms of spacing between metal plate electrodes, metal width, metal length, and/or metal thickness) on a zone-by-zone basis. As illustrated, low conversion gain capacitor 317-A is located within central zone 325-1 and low conversion gain capacitors 317-B, 317-C, and 317-D are respectively located in zones 325-7, 325-6, and 325-5 (e.g., adjacent to or otherwise along perimeter 380 of pixel cell array 305). In the foregoing examples, low conversion gain capacitor 317 located with central zone 325-1 corresponds to a reference design from which other designs in different zones may be modified. However, it is appreciated that in other embodiments a different reference design and/or zone may be selected that is not centrally located. As illustrated, low conversion gain capacitor 317-A includes electrodes 340-1A and 340-2A, low conversion gain capacitor 317-B includes electrodes 340-1B and 340-2B, low conversion gain capacitor 317-C includes electrodes 340-1C and 340-2C, and low conversion gain capacitor 317-D includes electrodes 340-1D and 340-2D.

In the illustrated embodiment, each of low conversion gain capacitors 317-A, 317-B, and 317-D have a same fixed pattern design (e.g., overall layout of metal interconnects that form respective electrodes is the same) which is different from the fixed pattern design of low conversion gain capacitor 317-C (e.g., a portion 385 of the fixed pattern design is omitted relative to the fixed pattern design of low conversion gain capacitors 317-A, 317-B, and 317-D). In the same or other embodiments, a first metal thickness of electrodes 340-1A and/or 340-2A of low conversion gain capacitor 317-A may be greater than a second metal thickness of electrodes 340-1B and/or 340-2B of low conversion gain capacitor 317-B. In the same or other embodiments, the first metal thickness of electrodes 340-1A and/or 340-2A of low conversion gain capacitor 317-A may be less than a third metal thickness of electrodes 340-1C and/or 340-2C of low conversion gain capacitor 317-C. In the same or other embodiments, the first metal thickness of electrodes 340-1A and/or 340-2A of low conversion gain capacitor 317-A may be the same as or equal to a fourth metal thickness of electrodes 340-1D and/or 340-2D of low conversion gain capacitor 317-D. In some embodiments, differences between the first metal thickness, the second metal thickness, the third metal thickness, and the fourth metal thickness may be within the nanometer order (e.g., difference between the first and second metal thicknesses may be less than 10 nm).

In one embodiment, a separation distance 361-S1A (e.g., metal spacing) between fingers of electrode 340-1A and electrode 340-2A of low conversion gain capacitor 317-A is greater than a separation distance 361-S1B (e.g., metal spacing) between fingers of electrode 340-1B and electrode 340-2B of low conversion gain capacitor 317-B on nanometer order. In the same or other embodiments, a separation distance 361-S1A (e.g., metal spacing) between fingers of electrode 340-1A and electrode 340-2A of low conversion gain capacitor 317-A is less than a separation distance 361-S1D (e.g., metal spacing) between fingers of electrode 340-1D and electrode 340-2D of low conversion gain capacitor 317-D on nanometer order. In the same or other embodiments, a separation distance 361-S1A (e.g., metal spacing) between fingers of electrode 340-1A and electrode 340-2A of low conversion gain capacitor 317-A is the same as a separation distance 361-S1C (e.g., metal spacing) between fingers of electrode 340-1C and electrode 340-2C of low conversion gain capacitor 317-C on nanometer order.

In one embodiment, a metal width 363-WIA, 363-W2A of fingers included in electrode 340-1A or electrode 340-2A of low conversion gain capacitor 317-A is greater than a metal width 363-W1B, 363-W2B of fingers included in electrode 340-1B and electrode 340-2B of low conversion gain capacitor 317-B. In the same or other embodiments, a metal width 363-W1A, 363-W2A of fingers included in electrode 340-1A or electrode 340-2A of low conversion gain capacitor 317-A is less than a metal width 363-WID, 363-W2D of fingers included in electrode 340-1D and electrode 340-2D of low conversion gain capacitor 317-D. In the same or other embodiments, a metal width 363-W1A, 363-W2A of fingers included in electrode 340-1A or electrode 340-2A of low conversion gain capacitor 317-A is the same as a metal width 363-W1C, 363-W2C of fingers included in electrode 340-1C and electrode 340-2C of low conversion gain capacitor 317-C.

In general, it is appreciated that the designs of low conversion gain capacitors (e.g., low conversion gain capacitors 317-A, 317-B, 317-C, and 317-D) or other conversion gain capacitors included in individual pixel cells of pixel cell array 305 are adjusted on a zone-by-zone basis (e.g., based on method 300 illustrated in FIG. 3A) to compensate for performance variance when a uniform design is utilized across pixel cell array 305 (e.g., due to fabrication variance, inaccuracy, or discrepancy across the die of the pixel cell array relative to the uniform design). For example, dimensions associated with low conversion gain capacitors (e.g., metal width, metal length, metal spacing, metal thickness) or other capacitors included in the one or more capacitors may be adjusted to increase or decrease capacitance and thus conversion gain on a zone-by-zone basis. By doing so, pixel cell array 305 may have improved conversion gain ratio uniformity in accordance with embodiments throughout the disclosure. It is appreciated that in some embodiments, each of low conversion gain capacitors 317-A, 317-B, 317-C, and 317-D or other conversion gain capacitors located in different zones may have the same (e.g., within 1%) effective capacitance or otherwise result in associated pixel cells having the same gain conversion gain (e.g., low conversion gain, high conversion gain), same conversion gain ratio (e.g., high conversion gain with respect to low conversion gain), or other characteristic metric even though the designs and physical shape and/or structure of the aforementioned low conversion gain capacitors or other conversion gain capacitors are different on a zone-by-zone basis. This is because in some embodiments the zone-by-zone design of the low conversion gain capacitors or other conversion gain capacitors compensates for fabrication variance (i.e., depending on the location within a wafer or die the resultant structure may not exactly match the associated design and how the degree of mismatch is based, at least in part, on the location within the die and/or wafer). Indeed, by having a zone-by-zone design that is empirically determined in accordance with embodiments of the disclosure, switchable conversion gain image sensors with improved conversion gain ratio uniformity, conversion gain uniformity, and/or capacitance uniformity associated with conversion gain capacitors may be achieved.

It is appreciated that embodiments of the disclosure illustrated in FIG. 1A-3C may be fabricated using conventional semiconductor device processing and microfabrication techniques known by one of ordinary skill in the art, which may include, but is not limited to, photolithography, ion implantation, chemical vapor deposition, physical vapor deposition, thermal evaporation, sputter deposition, reactive-ion etching, plasma etching, wafer bonding, chemical mechanical planarization, and the like. It is appreciated that the described techniques are merely demonstrative and not exhaustive and that other techniques may be utilized to fabricate one or more components of various embodiments of the disclosure.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A switchable conversion gain (SCG) image sensor, comprising:

a pixel cell array including a plurality of pixel cells arranged in rows and columns, wherein individual pixel cells included in the plurality of pixel cells each include:

one or more photodiodes configured to generate image charge in response to incident light;

a plurality of conversion gain capacitors, including a high conversion gain capacitor with a first capacitance and a low conversion gain capacitor with a second capacitance, wherein the second capacitance is greater than the first capacitance; and a switch transistor coupled between the high conversion gain capacitor and the low conversion gain capacitor, wherein the high conversion gain capacitor and the low conversion gain capacitor are selectively coupled to receive the image charge from the one or more photodiodes, wherein the pixel cell array is segmented into a plurality of zones, and wherein the low conversion gain capacitor for the individual pixel cells physically vary on a zone-by-zone basis.

2. The SCG image sensor of claim 1, wherein the low conversion gain capacitor corresponds to a metal-oxide-metal capacitor, and wherein at least one of a fixed pattern layout, a metal width, a metal length, a metal spacing, or a metal thickness for the low conversion gain capacitor differ on the zone-by-zone basis, and wherein groups of the low conversion gain capacitors within individual zones of the plurality of zones are identical.

3. The SCG image sensor of claim 1, wherein the plurality of zones includes a first zone centrally located within the pixel cell array and a second zone positioned adjacent to an edge of the pixel cell array.

4. The SCG image sensor of claim 3, wherein a first lateral area of the first zone is greater than a second lateral area of the second zone.

5. The SCG image sensor of claim 1, wherein a performance ratio between a first conversion gain associated with a high conversion gain mode and a second conversion gain associated with a low conversion gain mode across the pixel cell array for the SCG image sensor is substantially uniform.

6. The SCG image sensor of claim 1, wherein the low conversion gain capacitor for the individual pixel cells include a first electrode and a second electrode that form interdigitated fingers within a metallization region of the SCG image sensor, and wherein at least one of a metal thickness of the interdigitated fingers or a metal spacing between adjacent fingers included in the interdigitated fingers vary on the zone-by-zone basis.

7. The SCG image sensor of claim 6, wherein the metal thickness and the metal spacing for the low conversion gain capacitor within individual zones of the plurality of zones is identical.

8. A method for improved uniformity of a switchable conversion gain (SCG) image sensor, the method comprising:

generating a non-uniformity map describing performance variance across a pixel cell array for the SCG image sensor, and wherein the performance variance is associated with one or more conversion gain capacitors included in individual pixel cells of a pixel cell array included in the SCG image sensor;

segmenting a schematic of the SCG image sensor by dividing the pixel cell array into a plurality of zones based on the non-uniformity map; and generating designs for the one or more conversion gain capacitors included in the individual pixel cells of the pixel cell array on a zone-by-zone basis with respect to the plurality of zones based, at least in part, on the non-uniformity map to reduce the performance variance.

9. The method of claim 8, wherein generating the designs for the one or more conversion gain capacitors includes generating a first design associated with a first zone included in the plurality of zones and a second design associated with a second zone included in the plurality of zones, and wherein the first design is different from the second design.

10. The method of claim 9, wherein the first zone is centrally located within the pixel cell array and the second zone is positioned adjacent to an edge of the pixel cell array.

11. The method of claim 10, wherein a first lateral area of the first zone is greater than a second lateral area of the second zone.

12. The method of claim 9, wherein the one or more conversion gain capacitors associated with the individual pixel cells in the first zone and the second zone include a low conversion gain capacitor corresponding to a metal-oxide-metal capacitor, and wherein the first design and the second design are different based on at least one of a fixed pattern layout, a metal spacing, or a metal thickness of the low conversion gain capacitor.

13. The method of claim 8, further comprising:

updating the schematic of the SCG image sensor based on the designs; and fabricating a revised SCG image sensor based on the updated schematic, wherein low conversion gain capacitors included in the one or more capacitors of the pixel cell array for the revised SCG image sensor vary on the zone-by-zone basis based on the designs.

14. The method of claim 8, further comprising:

acquiring the schematic representative of the SCG image sensor and a corresponding performance data characterizing the one or more conversion gain capacitors included in the individual pixel cells of the pixel cell array included in the SCG image sensor;

wherein the corresponding performance data includes at least one of:

(i) physical characteristic data for the pixel cell array representative of the one or more conversion gain capacitors included in each of the individual pixel cells, or (ii) electrical characteristic data for the pixel cell array representative of the one or more conversion gain capacitors included in each of the individual pixel cells.

15. The method of claim 14, wherein the physical characteristic data includes at least one of a measured fixed pattern layout, a measured metal spacing, or a measured metal thickness of a low conversion gain capacitor included in each of the individual pixel cells of the pixel cell array.

16. The method of claim 14, wherein the electrical characteristic data includes at least one of a capacitance of a low conversion gain capacitor included in each of the individual pixel cells of the pixel cell array or a conversion gain associated with the low conversion gain capacitor included in each of the individual pixel cells of the pixel cell array.

17. The method of claim 8, wherein the one or more conversion gain capacitors include a low conversion gain capacitor corresponding to a metal-oxide-metal capacitor, wherein the low conversion gain capacitor for a given pixel cell included in the individual pixel cells is coupled to a corresponding photodiode included in the given pixel cell to facilitate switchable conversion gain operation of the SCG image sensor, and wherein the generating the designs for the one or more conversion gain capacitors further includes determining a metal thickness or a metal spacing for the low conversion gain capacitor included in the individual pixel cells across the pixel cell array with the corresponding performance data.

18. The method of claim 8, wherein the SCG image sensor includes a high conversion gain mode and a low conversion gain mode associated with the one or more capacitors, and wherein the non-uniformity map relates variation in performance across the pixel cell array between the high conversion gain mode and the low conversion gain mode for the individual pixel cells.

19. The method of claim 18, wherein the non-uniformity map includes at least one of a conversion gain ratio or a capacitance ratio between the high conversion gain mode and the low conversion gain mode for each of the individual pixel cell included in the pixel cell array.

20. The method of claim 8, wherein the segmenting the schematic of the SCG image sensor further comprises dividing the pixel cell array into the plurality of zones based on a deviation threshold defined based on the non-uniformity map.

* * * * *